US012745245B2

(12) United States Patent
Shi et al.

(10) Patent No.: US 12,745,245 B2
(45) Date of Patent: Sep. 22, 2026

(54) METHOD AND APPARATUS FOR ADJUSTING INITIAL VALUES OF OUTER-LOOP, AND COMPUTER-READABLE STORAGE MEDIUM

(71) Applicant: ZTE CORPORATION, Shenzhen (CN)

(72) Inventors: Ke Shi, Shenzhen (CN); Qiaoyan Liu, Shenzhen (CN); Kai Mao, Shenzhen (CN); Jianguo Li, Shenzhen (CN); Zepeng Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 179 days.

(21) Appl. No.: 18/260,514

(22) PCT Filed: Jun. 15, 2022

(86) PCT No.: PCT/CN2022/098970
§ 371 (c)(1),
(2) Date: Jul. 6, 2023

(87) PCT Pub. No.: WO2023/273891
PCT Pub. Date: Jan. 5, 2023

(65) Prior Publication Data

US 2024/0073893 A1 Feb. 29, 2024

(30) Foreign Application Priority Data

Jun. 28, 2021 (CN) ......................... 202110719864.9

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0003* (2013.01); *H04L 5/0053* (2013.01); *H04W 72/541* (2023.01)

(58) Field of Classification Search
CPC ................................................ H04W 72/1273
See application file for complete search history.

(56) References Cited

U.S. PATENT DOCUMENTS

2018/0242376 A1* 8/2018 Gunnarsson .......... H04W 24/10
2019/0349789 A1* 11/2019 Zeng ..................... H04L 1/0003

FOREIGN PATENT DOCUMENTS

CN 108702769 A 10/2018
CN 112929980 A 6/2021
(Continued)

OTHER PUBLICATIONS

International Searching Authority. International Search Report and Written Opinion for PCT Application No. PCT/CN2022/098970 and English translation, mailed Aug. 19, 2022, pp. 1-11.
(Continued)

*Primary Examiner* — Huy D Vu
*Assistant Examiner* — Latha Chakravarthy
(74) *Attorney, Agent, or Firm* — Vivacqua Crane, PLLC

(57) ABSTRACT

An outer loop initial value adjustment method, a device, and a readable storage medium are disclosed. The method may include: acquiring feature information of a plurality of User Equipment (UEs) scheduled by a cell; performing raster division on the feature information of the plurality of UEs to obtain a plurality of rasters; determining an outer loop corresponding to each of the rasters, where an outer loop value of each raster is within a target Block Error Rate (BLER) range; determining a target raster corresponding to a target UE according to the feature information of the target UE, where the target UE is one of the plurality of UEs
(Continued)

scheduled by the cell; and determining the outer loop value corresponding to the target raster as an initial outer loop value of the target UE.

18 Claims, 5 Drawing Sheets

(51) Int. Cl.
*H04L 5/00* (2006.01)
*H04W 72/541* (2023.01)

(56) References Cited

FOREIGN PATENT DOCUMENTS

| | | | |
|---|---|---|---|
| EP | 3557793 | A1 | 10/2019 |
| EP | 4072225 | A1 | 10/2022 |
| WO | 2012094874 | A1 | 7/2012 |
| WO | 2017151024 | A1 | 9/2017 |

OTHER PUBLICATIONS

European Patent Office. Extended European Search Report for EP Application No. 22831710.3, mailed Sep. 12, 2024, pp. 1-10.
International Searching Authority. International Preliminary Report on Patentability for PCT Application No. PCT/CN2022/098970 and English translation, mailed Dec. 14, 2023, pp. 1-8.
European Patent Office. Second Office Action for EP Application No. 22831710.3, mailed Apr. 28, 2026, pp. 1-9.

* cited by examiner

METHOD AND APPARATUS FOR ADJUSTING INITIAL VALUES OF OUTER-LOOP, AND COMPUTER-READABLE STORAGE MEDIUM

CROSS-REFERENCE TO RELATED APPLICATION

This application is a national stage filing under 35 U.S.C. § 371 of international application number PCT/CN2022/098970, filed Jun. 15, 2022, which claims priority to Chinese patent application No. 202110719864.9, filed Jun. 28, 2021. The contents of these applications are incorporated herein by reference in their entirety.

TECHNICAL FIELD

The present disclosure relates to the field of mobile communication technologies, and specifically to a method for adjusting an initial outer loop value, an apparatus and a computer-readable storage medium.

BACKGROUND

A wireless channel has a narrower coherence bandwidth and shorter coherence time than a wired channel. Therefore, fast change is a remarkable feature of the wireless channel. It is challenging to make full use of spectrum resources if a fixed modulation and coding scheme is adopted for wireless channels. Therefore, an Adaptive Modulation and Coding (AMC) technology is introduced in wireless communication technologies to improve spectral efficiency.

In the AMC technology, in order to realize the adaptation of a modulation and coding scheme and a channel condition of User Equipment (UE), it is necessary to adjust the outer loop according to a scheduling feedback result, Acknowledgement/Negative Acknowledgement (ACK/NACK), from the UE to achieve a target reliability requirement set by the system. However, such a convergence process generally consumes dozens or even hundreds of transmission opportunities. As a result, the transmission may end before some UEs reach the converged state, or the UEs may have reached the converged state but the transmissions before the convergence are not performed based on an optimal modulation and coding scheme, which restricts the spectral efficiency and affects the user experience. Convergence means adjusting the outer loop to make the Block Error Rate (BLER) meet a target requirement.

Currently, considerable small-packet UEs are using 4th Generation Mobile Communication Technology (4G)/5th Generation Mobile Communication Technology (5G) networks. Small packets refer to discontinuous burst services. The AMC of small-packet UEs ends before the service converges, restricting the spectral efficiency. In order to allow the small-packet UEs to reach the converged state as quickly as possible, it is necessary to set an outer loop value closer to the converged state as an initial outer loop value to reduce the number of transmissions required for the convergence process.

SUMMARY

The following is a summary of the subject matter set forth in this description. This summary is not intended to limit the scope of protection of the claims.

Embodiments of the present disclosure provide a method for adjusting an initial outer loop value, an apparatus and a computer-readable storage medium.

In accordance with an aspect of the present disclosure, an embodiment provides a method for adjusting an initial outer loop value. The method may include: acquiring feature information of a plurality of UEs scheduled by a cell; performing raster division on the feature information of the plurality of UEs to obtain a plurality of rasters; determining an outer loop corresponding to each of the rasters, where an outer loop value of each raster is within a target BLER range; determining a target raster corresponding to a target UE according to the feature information of the target UE, where the target UE is one of the plurality of UEs scheduled by the cell; and determining the outer loop value corresponding to the target raster as an initial outer loop value of the target UE.

In accordance with another aspect of the present disclosure, an embodiment provides an apparatus. The apparatus may include: a memory, a processor, and a computer program stored in the memory and executable by the processor which, when executed by the processor, causes the processor to implement the method for adjusting an initial outer loop value described above.

In accordance with another aspect of the present disclosure, an embodiment provides a computer-readable storage medium, storing a computer-executable instruction which, when executed by a processor, causes the processor to implement the method for adjusting an initial outer loop value described above.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims, and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure.

DETAILED DESCRIPTION

Figure 1:
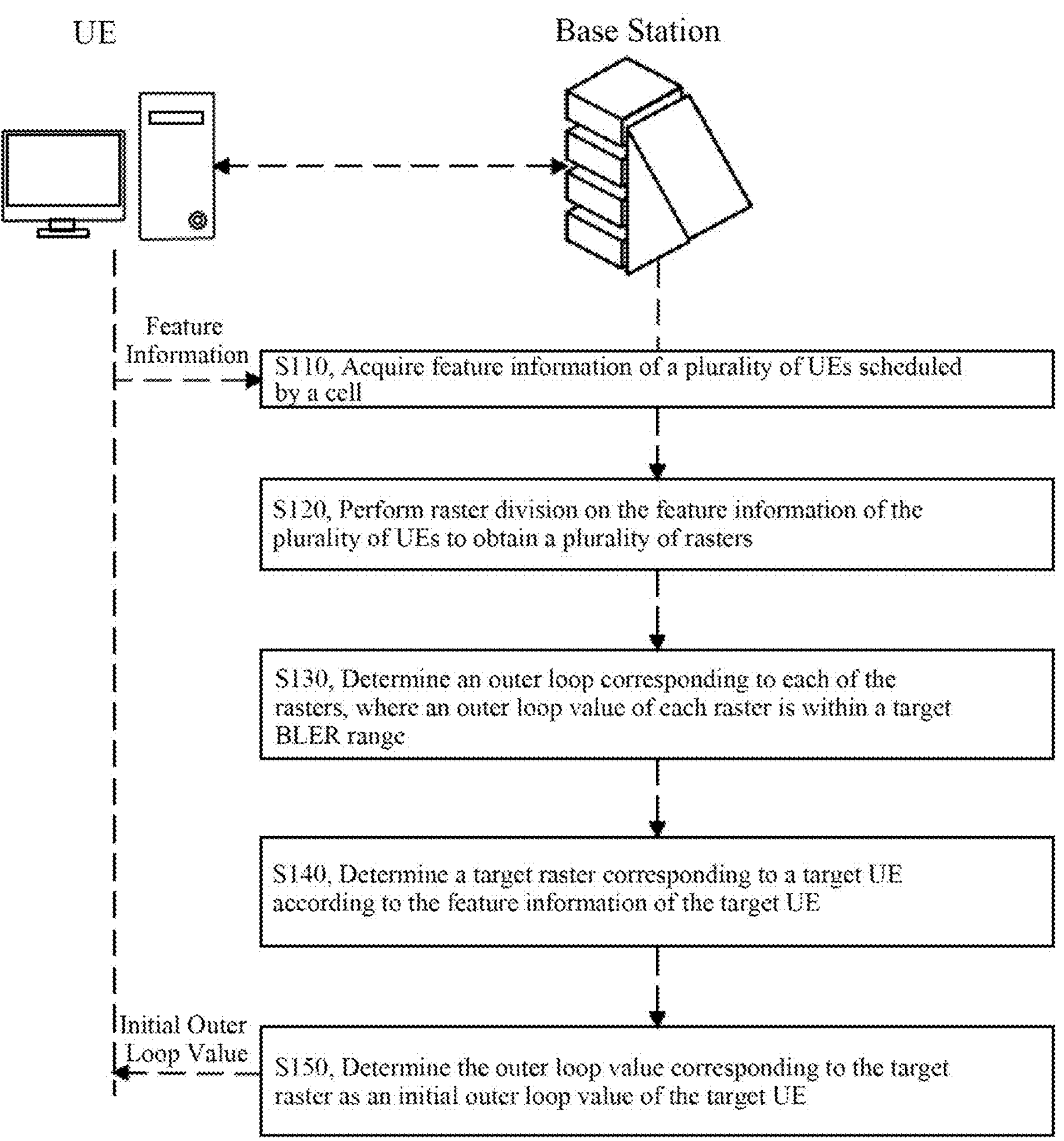
FIG. 1 is a flowchart of a method for adjusting an initial outer loop value according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In some cases, AMC is an adaptive coding and modulation technology adopted on wireless channels, and is used for adjusting a modulation scheme and coding rate of a wireless link transmission to ensure transmission quality of the link. When the channel condition is poor, a small modulation and coding rate are selected. When the channel condition is good, a large modulation is selected, thereby maximizing the transmission rate. After the coding technology and modulation scheme are adjusted, the channel quality will also be improved accordingly. During the adjustment process of AMC, the system always expects the data transmission rate to be consistent with the channel variation trend, so as to maximize the utilization of the transmission capacity of the wireless channel.

In the AMC technology, the selection of the coding and modulation scheme is realized by two control loops, including an inner loop and an outer loop. The inner loop means that a base station determines a Modulation and Coding Scheme (MCS) for uplink and downlink signals of a UE according to a channel condition of the UE. The outer loop is a process in which the base station feeds back and adjusts the MCS of the UE according to a BLER of signal transmission to ensure as far as possible that an actual BLER of signal transmission is maintained near a target BLER. In order to realize the adaptation of a modulation and coding scheme and a channel condition of a UE, the outer loop is to be adjusted according to a scheduling feedback result, ACK/NACK from the UE to achieve a target reliability requirement set by the system.

The process of allowing the BLER to reach the target BLER requirement through the adjustment of the outer loop is called convergence. The outer loop may also be understood as an outer loop value. However, since all UEs share a unified initial outer loop value, such a convergence process generally consumes dozens or even hundreds of transmission opportunities. As a result, in some cases, the transmission may end before a UE reaches the converged state, or in some cases, the UE may have reached the converged state but the transmissions before the convergence are not performed based on an optimal modulation and coding scheme, which restricts the spectral efficiency and affects the user experience.

Currently, considerable number of small-packet UEs are using 4G/5G networks. Small packets refer to discontinuous burst services. The AMC of small-packet UEs ends before the service converges, restricting the spectral efficiency. In order to allow the small-packet UEs to reach the converged state as quickly as possible, it is necessary to set an outer loop value closer to the converged state as an initial outer loop value to reduce the number of transmissions required for the convergence process.

In view of the above, the present disclosure provides a method for adjusting an initial outer loop value in AMC, where a UE determines its respective initial outer loop value according to a raster to which the UE belongs, instead of assigning each UE with the same initial outer loop value. In addition, in the present disclosure, the outer loop value of each raster can be adaptively adjusted according to the scheduling feedback result in the actual environment. Furthermore, the system performance can also be monitored in real time. If it is found that the raster division does not match the current environment, online raster division learning is started based on collected network data. The method of the present disclosure can better adapt to the current actual wireless environment and is more robust to environmental changes. The initial outer loop value obtained is closer to a converged value for the converged state, which is beneficial to expedite the convergence of the outer loop and improving the spectral efficiency.

The technical schemes in the present disclosure will be described with reference to the accompanying drawings. Apparently, some embodiments but not all embodiments of the present disclosure are described.

FIG. 1 is a flowchart of a method for adjusting an initial outer loop value according to an embodiment of the present disclosure. Referring to FIG. 1, the method includes, but is not limited to, the following operations S110 to S150.

At S110, feature information of a plurality of User Equipment (UEs) scheduled by a cell are acquired.

At S120, raster division is performed on the feature information of the plurality of UEs to obtain a plurality of rasters.

At S130, an outer loop corresponding to each of the rasters is determined, where an outer loop value of each raster is within a target Block Error Rate (BLER) range.

At S140, a target raster corresponding to a target UE is determined according to the feature information of the target UE, where the target UE is one of the plurality of UEs scheduled by the cell.

At S150, the outer loop value corresponding to the target raster is determined as an initial outer loop value of the target UE.

It can be understood that the convergence process corresponding to different feature information of the UEs has a different adjustment value. In order to allow a UE to reach a converged state as quickly as possible, it is necessary to set an outer loop value closer to the converged state as an initial outer loop value to reduce the number of transmissions required for the convergence process. The UE may be a mobile phone, a tablet computer, a notebook computer, or the like.

In the above method, the feature information of the plurality of UEs is acquired according to scheduling data collected in the cell. The feature information may include a type, channel quality or other features of the UE. Then, raster division is performed on the feature information of the plurality of UEs. Each piece of feature information corresponds to one raster, so that each piece of feature information can be characterized by the corresponding raster. A relationship between a raster and the corresponding feature information is established, to facilitate the management of the feature information of the UEs based on the rasters. The initial outer loop value determined by the method according to this embodiment will be provided to a UE, such that the UE can have an initial outer loop value close to the converged state.

At S130, a respective outer loop corresponding to each raster is determined. It can be understood that the outer loop is adjusted according to feedback from the UE in the AMC technology. The outer loop is a process of adjusting the MCS of the UE according to a BLER to ensure that an actual BLER is maintained within a target BLER range. Therefore, in some embodiments of the present disclosure, the feature information of the UEs is characterized by rasters, each raster corresponds to an outer loop. By determining the outer loop corresponding to each raster and positioning the outer loop value of the raster within the target BLER range, the outer loop value of each raster can be obtained, and each raster has an individual outer loop value.

At S140, during the determination of the initial outer loop value of the target UE, the corresponding target raster is selected according to the feature information of the target UE, and then the corresponding outer loop value is determined as the initial outer loop value of the target UE according to the target raster. That is, each UE can determine its respective initial outer loop value according to a raster to which the respective UE belongs. Compared with conventional schemes in which all UEs share the same initial outer loop value, the method of the present disclosure can be more adaptive to the current actual wireless environment and is more robust to changes in the environment. The initial outer loop value obtained is closer to a converged value for the converged state, which is beneficial to expedite the convergence of the outer loop and improve spectral efficiency.

Figure 2:
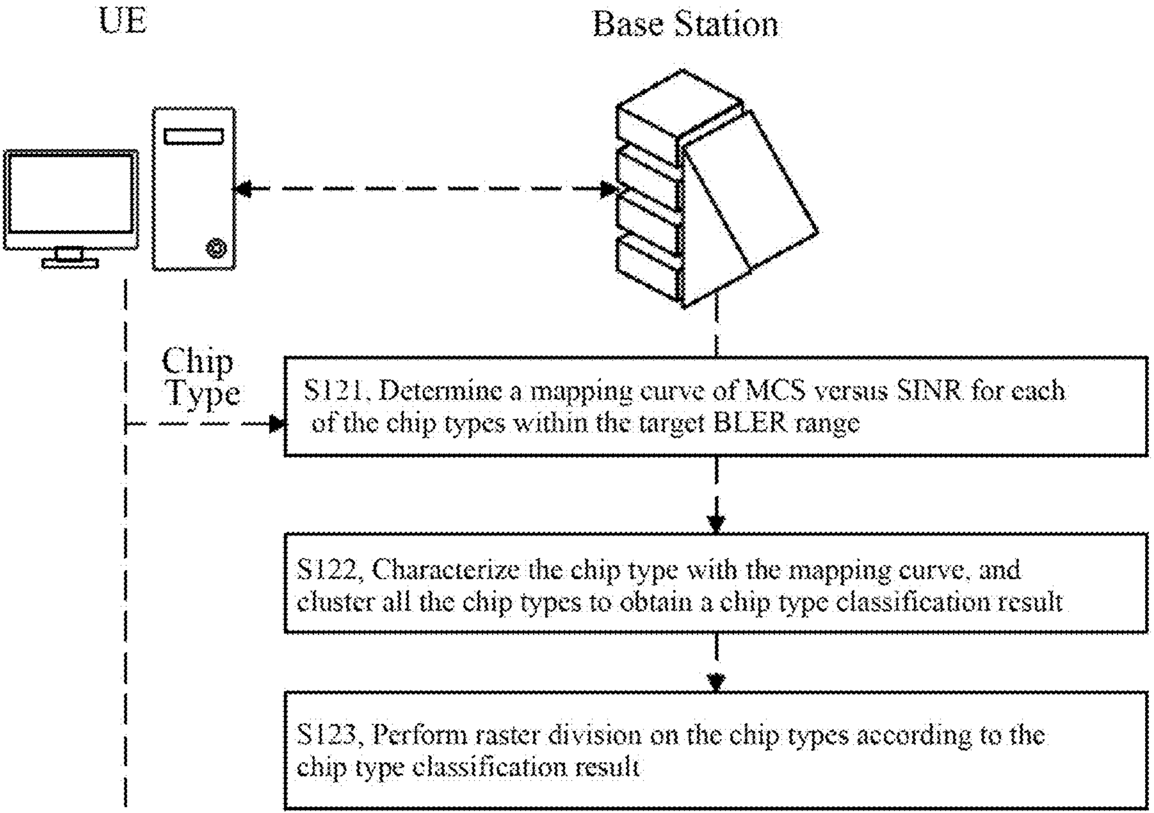
FIG. 2 is a flowchart of raster division based on feature information according to an embodiment of the present disclosure.

In some embodiments, a chip type of the UE serves as the feature information. Performing raster division on the feature information of the plurality of UEs at S120 includes performing raster division on the chip types As shown in FIG. 2, S120 further includes the following operations S121 to S123.

At S121, a mapping curve of an MCS versus a Signal-to-Interference-plus-Noise Ratio (SINR) for each of the chip types within the target BLER range is determined.

At S122, the chip type is characterized by the mapping curve, and all the chip types are clustered to obtain a chip type classification result.

At S123, raster division is performed on the chip types according to the chip type classification result.

It can be understood that a demodulation capability of each chip type is represented by the mapping curve of MCS versus SINR, and then a slope and an intercept of the mapping curve serve as a sample point representing the mapping curve, and the chip type is thus represented. Sets of sample points are classified into multiple classes by clustering. Raster division is performed on the chip types of the UEs according to a clustering result, so as to obtain rasters corresponding to the chip types. Taking mobile phones as an example, different mobile phones have different chip types, such as a baseband chip. The chip types of the mobile phones are expressed in the form of a mapping curve of the MCS versus the SINR, such that, the demodulation capabilities of mobile phones of different types can be reflected by the mapping curve.

During the determination of the mapping curve for each chip type within the target BLER range, a two-dimensional table of the MCS versus the SINR is constructed; a scheduling feedback result, Acknowledge/Non-Acknowledge, (ACK/NACK) is delivered in the two-dimensional table according to the MCS and the SINR; a BLER of each cell in the two-dimensional table is calculated according to the scheduling feedback result ACK/NACK; first cells whose BLERs satisfy the target BLER range are selected, where each of the first cells contains a pair of MCS and SINR; and the mapping curve of the MCS versus the SINR is obtained according to all the first cells. Thus, the performance of the chip type is reflected by the mapping curve.

Considering that the feature information of the UE is not limited to the chip type mentioned in the above embodiment and may also include a transmission mode, a channel quality, an interference power or the like, different raster division methods may be adopted for different types of feature information, as long as different rasters each have an individual outer loop value. After raster division is respectively performed on the chip types, the transmission modes, the channel qualities and the interference powers of the UEs, a plurality of one-dimensional rasters respectively corresponding to the chip types, the transmission modes, the channel qualities and the interference powers are obtained. A multi-dimensional mesh may be generated according to the plurality of rasters to facilitate data management.

In some embodiments, the determination of the outer loop corresponding to each raster at S130 can be performed with the following process. In particular, a one-dimensional table of outer-loop is constructed in each raster, and a scheduling feedback result ACK/NACK is delivered correspondingly. Then, a BLER of each cell in the one-dimensional table is calculated. The second cells whose BLERs satisfy the target BLER range are selected, where each of the second cells contains two pieces of information, i.e., outer loop and sample size. And an outer loop value and a sample size corresponding to each of the rasters are obtained through weighted averaging on all the second cells. That is to say, each raster has a corresponding sample size and a corresponding outer loop, and the corresponding outer loop value can be quickly found according to the raster.

It should be noted that during the subsequent online adjustment of the outer loop value, in order to allow different similar rasters to be counted together and updated together to improve efficiency and accuracy, it is necessary to classify the rasters and group similar rasters into one class, establish a mapping relationship from the rasters to the class, and determine the outer loop value of the class. The classification into classes may be performed with a regression tree technology. A specific process is described in the following example.

During the determination of the initial outer loop value of the UE, the raster to which the UE belongs is found according to the feature information of the UE, and the outer loop value of the class to which the raster belongs is determined as the initial outer loop value of the UE according to the mapping relationship between the rasters and the class.

Since the collected network data is being updated, the outer loop value of the class may also be corrected according to an actual situation. Therefore, it is also necessary to adjust the outer loop value of the corresponding class according to the scheduling feedback result of the UE, such that the outer loop value of the class is always kept within the target BLER range. The outer loop value is adaptively adjusted according to a feedback result in an actual environment, thereby effectively improving the spectral efficiency.

It can be understood that the system performance may also be monitored in real time. The out-of-expectation performance of the model indicates the mismatch of the raster division with the current environment. In that case, online raster division learning is started based on the collected network data.

In some implementations, after determining the outer loop value of the class as the initial outer loop value of the target UE, the method further includes:

adjusting the outer loop value of each class according to the scheduling feedback result, including:

counting a number of ACKs and a number of NACKs for each class according to a respective scheduling feedback result;

for each class, increasing the outer loop value of the respective class according to a unit adjustment amount if a ratio of the number of NACKs corresponding to the respective class to a sum of the number of ACKs and the number of NACKs corresponding to the respective class is less than a first set value; or for each class, decreasing the outer loop value of the respective class according to the unit adjustment amount if the ratio of the number of NACKs corresponding to the respective class to the sum of the number of ACKs and the number of NACKs corresponding to the respective class is greater than a second set value.

In some implementations, adjusting the outer loop value of each class according to the scheduling feedback result further includes:

for each class, keeping the outer loop value of the respective class unchanged if the ratio of the number of NACKs corresponding to the respective class to the sum of the number of ACKs and the number of NACKs corresponding to the class is greater than or equal to the first set value and less than or equal to the second set value.

In some implementations, the method further includes:

calculating a BLER according to the scheduling feedback results of all the UEs; and determining whether the BLER satisfies a preset value, and if not, re-executing raster division on the feature information of the plurality of UEs, and re-determining the initial outer loop value of the target UE.

Figure 3:
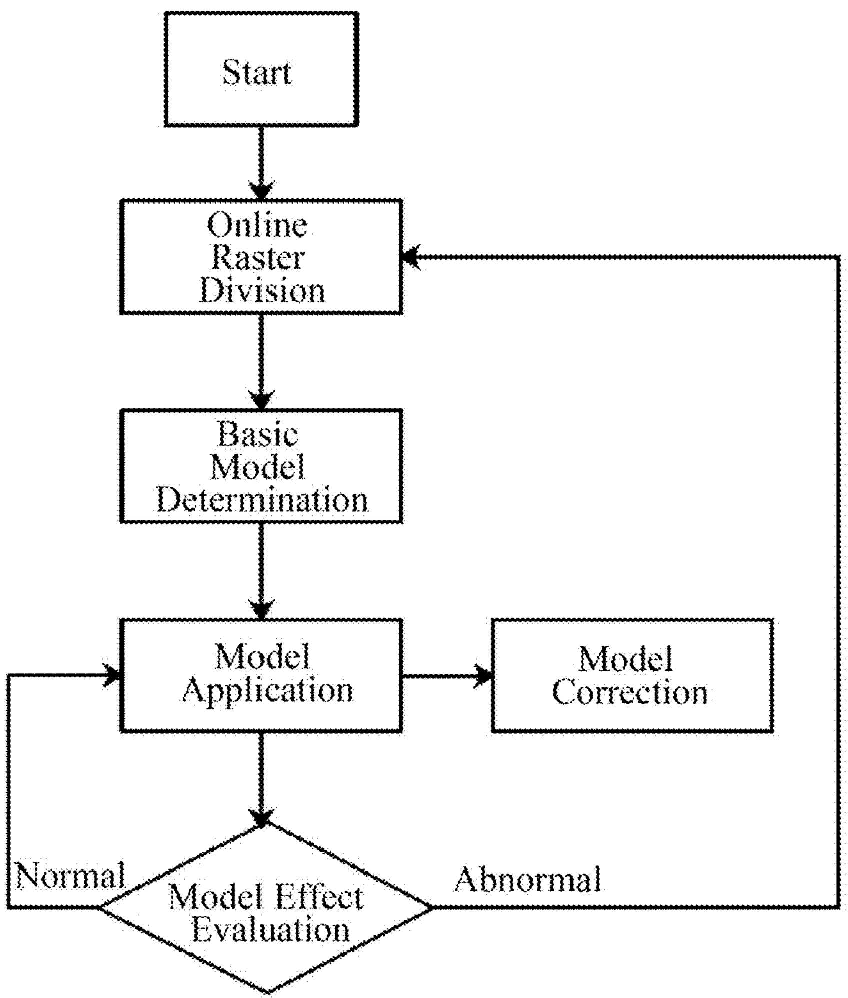
FIG. 3 is a flowchart of a method for adjusting an initial outer loop value according to another embodiment of the present disclosure.

Referring to FIG. 3, the method for adjusting an initial outer loop value may be understood as mainly including five operations: online raster division, basic model determination, model application, model correction and model effect evaluation. After the adjustment is started, online raster division is performed according to the network data, and a basic model for the current raster division is determined. Then, the model is applied when the initial outer loop value is required, and model correction based on the concept of reinforcement learning is performed according to an environmental feedback after the model is applied to obtain and save the latest model for subsequent application.

The system periodically evaluates the effect of the model. If the effect of the model is normal and is as expected, no processing is performed, and the model continues to be applied. If the effect of the model is abnormal, the operations including online raster division, basic model determination, model application, and model correction are performed again based on the latest network data, and the entire system continues to run, thereby adaptively adjusting the model to adapt to the environment.

The method for adjusting an initial outer loop value is described by way of examples with the features including the chip types, transmission modes, channel qualities and interference powers of the UEs.

Example One

First, online raster division is performed with the latest scheduling data. The online raster division includes two parts: classification of chip types of UEs and raster division based on other features. Operations S210 to S230 are directed to the classification of chip types of UEs, and operation S240 is directed to the raster division based on other features.

At S210, a mapping curve of MCS versus SINR for each chip type within a target BLER range is acquired as a feature to characterize each chip type. For each chip type, the following operations S211 to S213 are performed.

At S220, a slope and an intercept of the mapping curve of each chip type are taken as a sample point to represent the chip type, a plurality of sample points each corresponding to a respective one of a plurality of chip types are clustered, and a chip type of each class is determined according to the sample point including the slope and the intercept of the respective class.

A K-means clustering algorithm is adopted as the clustering method, with the number of clusters k being set to 4. The k-means clustering algorithm is to classify data into k clusters repeatedly according to a certain distance function based on a given set of data points and a desired number of clusters k, which process is repeated until a certain termination condition is met. The clustering process is simple and efficient.

At S230, exception handling is performed. If a valid (MCS, SINR) point pair of a chip type is less than ThrDot, or if the slope of the mapping curve of the MCS versus the SINR obtained by linear fitting is greater than HighThrSlope, or if the slope of the mapping curve of the MCS versus the SINR obtained by linear fitting is less than LowThrSlope, it is determined that this chip type is not engaged in clustering, and all chip types that are not engaged in clustering are classified as one class, where ThrDot=4, HighThrSlope=2.5, and LowThrSlope=0.5.

Figure 4:
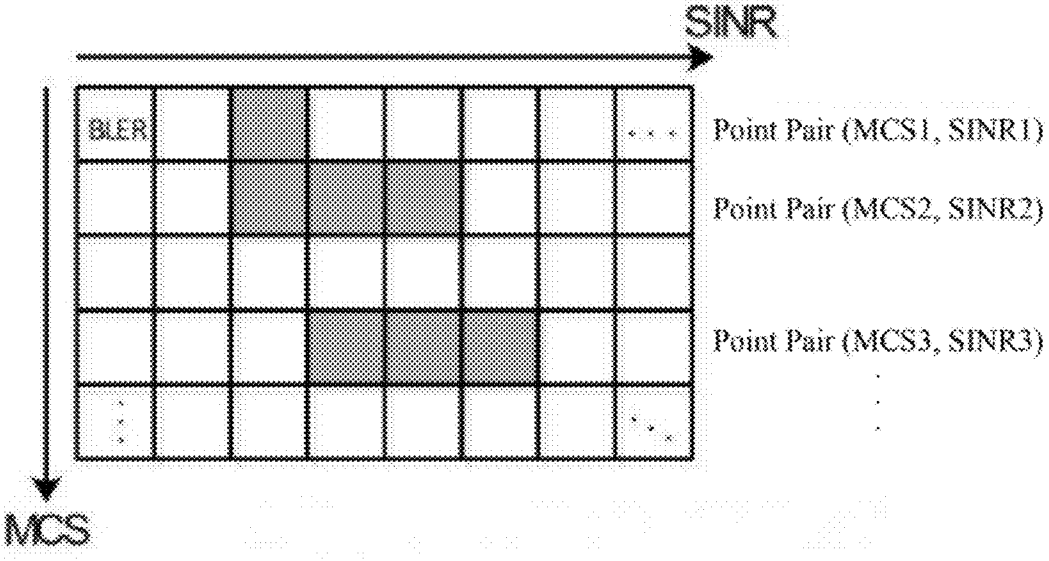
FIG. 4 is a schematic diagram of a two-dimensional table constructed in classification of a chip type of UE according to an embodiment of the present disclosure.

Referring to FIG. 4, S210 includes the following operations S211 to S213.

At S211, a two-dimensional table of a scheduling MCS and an inner loop SINR is constructed, where each order of the scheduling MCS corresponds to one row of the table, and every $X_1$ dB of the inner loop SINR corresponds to one column of the table, where the value of $X_1$ is 2. A scheduling feedback result ACK/NACK corresponding to the scheduling MCS and the inner loop SINR is delivered in the two-dimensional table, a sample size in each cell is calculated, and a BLER is calculated, where BLER=NACK/(ACK+NACK).

At S212, for each MCS, inner loop SINR cells whose BLERs fall within the target BLER range are selected. The target BLER range of the BLER is set to [7%, 13%]. If no cell satisfies this condition, the point pair including the MCS and the corresponding inner loop SINR is recorded as (the MCS, NAN). If only one cell satisfies this condition, the point pair including the MCS and the corresponding inner loop SINR is recorded as (the MCS, a median value of two boundaries of the cell satisfies this condition); If more than one cell (e.g., Y cells) satisfies this condition, the inner loop SINR corresponding to the MCS is:

$$\sum_{i=1}^{Y} \frac{\text{sample size of an i-th cell satisfying the condition}}{\sum_{i=1}^{Y} \text{sample size of an i-th cell satisfying the condition}} \cdot \text{median value of two boundaries of the i-th cell satisfying the condition.}$$

For each MCS, one point pair (MCS, SINR) is obtained, and the point pairs in which the SINR is NAN are deleted.

It should be noted that in the table shown in FIG. 4, shaded cells represent cells whose BLERs fall within the target BLER range, and non-shaded cells represent cells whose BLERs do not fall within the target BLER range or the calculation of the BLERs of those cells are not available.

At S213, a mapping curve of the MCS versus the SINR is obtained by linear fitting according to all valid (MCS, SINR) point pairs, where a slope and an intercept of the mapping curve are taken as features to characterize the chip type.

At S240, raster division is performed on the chip types, the transmission modes, the channel qualities and the interference powers of the UEs. A raster number in the chip type dimension of UEs is Nchiptype=K+1=5. For uplink transmission, there are two transmission modes (single port, closed-loop space division multiplexing), i.e., Ntrans=2. For downlink transmission, there are three transmission modes (optimal beam, closed-loop space division multiplexing, beamforming), i.e., Ntrans=3. The channel quality is divided into Nsinr=10 rasters at equal intervals. The interference power is divided into Nni=10 at equal intervals. Four-dimensional meshes with a total number of Nmesh are generated, where Nmesh=Nchiptype×Ntrans×Nri×Nsinr×Nni=2000 (for uplink) or 6000 (for downlink). Each raster is identified by a raster identifier (ID).

Figure 5:
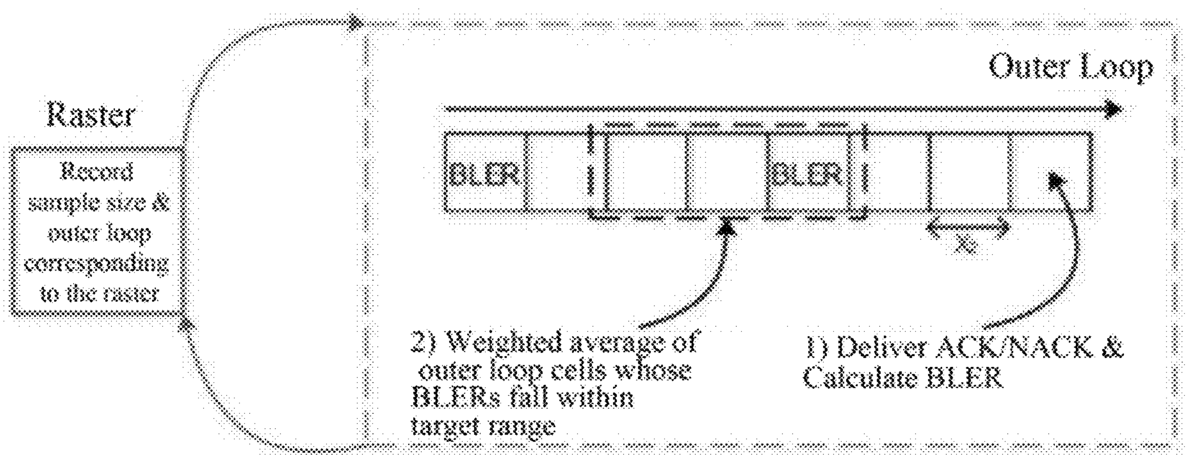
FIG. 5 is a schematic diagram of constructing a one-dimensional table of outer-loop for each raster according to an embodiment of the present disclosure.

Referring to FIG. 5, at S250, an outer loop corresponding to each of the rasters is determined. S250 includes the following operations S251 and S252.

At S251, a one-dimensional table of outer-loop is constructed, where every $X_2$ dB of the outer loop corresponds to one cell, and $X_2=2$. A corresponding scheduling feedback result ACK/NACK is delivered in the one-dimensional table according to the feature and outer loop corresponding to the raster, a sample size in each cell is calculated, and a BLER is calculated, where BLER=NACK/(ACK+NACK).

At S252, outer loop cells whose BLERs fall within the target BLER range are selected, where the target BLER range is set to [7%, 13%]. If no cell satisfies this condition, the sample size corresponding to the raster is recorded as 0, and the outer loop corresponding to the raster is a default value, where the default value is a unified initial outer loop value configured for all UEs by a conventional AMC policy. If only one cell satisfies this condition, the sample size corresponding to the raster is recorded as a sample size of the cell, and the outer loop corresponding to the raster is the median value of the two boundaries of the cell that satisfies this condition). If more than one cell (e.g., Y cells) satisfies this condition, the sample size corresponding to the raster is a sum of sample sizes of the Y cells that satisfy this condition, and the outer loop corresponding to the raster is:

$$\sum_{i=1}^{Y} \frac{\text{sample size of an i-th cell satisfying the condition}}{\sum_{i=1}^{Y} \text{sample size of an i-th cell satisfying the condition}} \cdot \text{median value of two boundaries of the i-th cell satisfying the condition.}$$

At S260, each raster has a corresponding sample size and a corresponding outer loop. The raster is characterized by the corresponding outer loop in the raster, and the specific raster division is determined by means of the concept of decision regression tree. The following operations S261 to S264 are included.

At S261, all features and splittable points of the features are traversed, and an optimal splitting feature j satisfying $$\min_{j,s}\left(\sum_{x_i\in R_1(j,s)}(y_i-c_1)^2+\sum_{x_i\in R_2(j,s)}(y_i-c_2)^2\right)$$

and an optimal splitting point of this feature is selected. In the formula, $x_i$ represents a raster i, and $y_i$ represents a corresponding outer loop in the raster i; $R_1(j,s)=\{x|x^j\le s\}$ and $R_2(j,s)=\{x|x^j>s\}$ represents two classes obtained by classification, $x^j\le s$ represents all rasters with the feature j≤s, and $x^j>s$ represents all rasters with the feature j>s;

$$c_1=\sum_{x_i\in R_1(j,s)}\frac{num_i}{\sum_{x_i\in R_1(j,s)} num_i}\cdot y_i$$

represents a weighted average of outer loops corresponding to all rasters belonging to the first class, and $$c_2=\sum_{x_i\in R_2(j,s)}\frac{num_i}{\sum_{x_i\in R_2(j,s)} num_i}\cdot y_i$$

represents a weighted average of outer loops corresponding to all rasters belonging to the second class; and $num_i$ represents a sample size corresponding to the raster i.

At S262, classification is performed by means of the selected splitting feature j and the splitting point s, and $c_1$ and $c_2$ are respectively determined as the outer loop values of the classes.

At S263, S261 and S262 continue to be called for the two classes until a stop condition is satisfied. The stop condition is that a mean square error $$\sum_{x_i\in R(j,s)}(y_i-c)^2$$

of any class is less than a threshold ThrMse or a number of classes exceeds a threshold ThrNcluster, where ThrMse=0.5 and ThrNcluster=100.

At S264, a regression tree is generated, where each leaf node represents one class, a total number of classes is defined as Ncluster, and each class is numbered and identified by a class ID which is stored.

The basic model determination includes the following operation S270.

At S270, a mapping relationship between raster IDs and class IDs is established according to a regression tree result, where an outer loop value of each class is $$c=\sum_{x_i\in R(j,s)}\frac{num_i}{\sum_{x_i\in R(j,s)} num_i}\cdot y_i.$$

Figure 7:
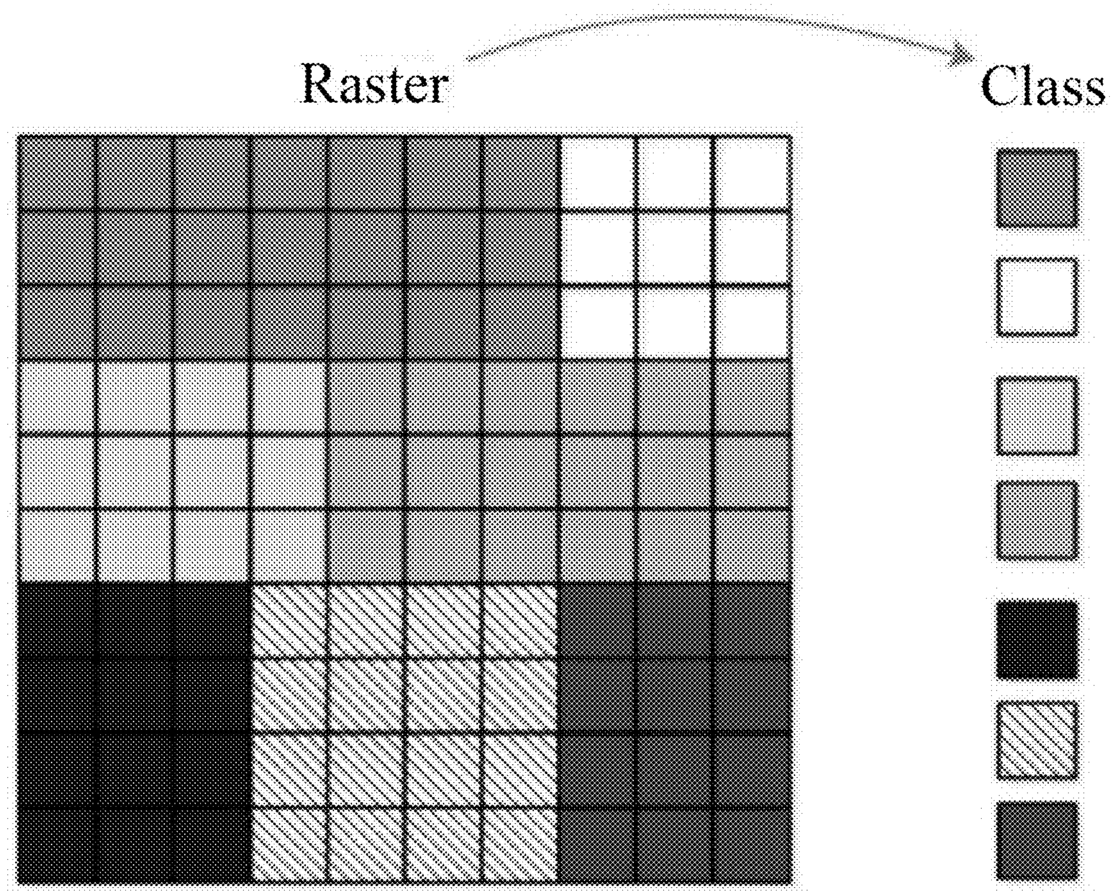
FIG. 7 is a schematic diagram showing a mapping relationship between rasters and classes according to an embodiment of the present disclosure.

Referring to FIG. 7, assuming that all rasters are tiled and the rasters shaded with the same manner belong to the same class, a mapping relationship between rasters and classes is established.

The model application includes the following operations S280 and S290.

At S280, when the initial outer loop value corresponding to the transmission mode of the UE is to be determined, the raster to which the UE belongs is determined according to the chip type, transmission mode, channel quality, and interference power of the UE, a class ID is found according to the mapping relationship between the raster IDs and the class IDs, and the outer loop value of the class is determined as an initial outer loop value of the transmission mode of the UE.

At S290, the class ID found in the above process is marked for the UE in this scheduling.

The model correction includes the following operations S300 and S310.

At S300, after receiving a scheduling feedback result marked with the class ID, a number of ACKs and a number of NACKs are counted for the corresponding class according to the scheduling feedback result. If the scheduling feedback result is ACK, 1 is added to the value of an ACK counter corresponding to the class. If the scheduling feedback result is NACK, 1 is added to the value of a NACK counter corresponding to the class.

Figure 6:
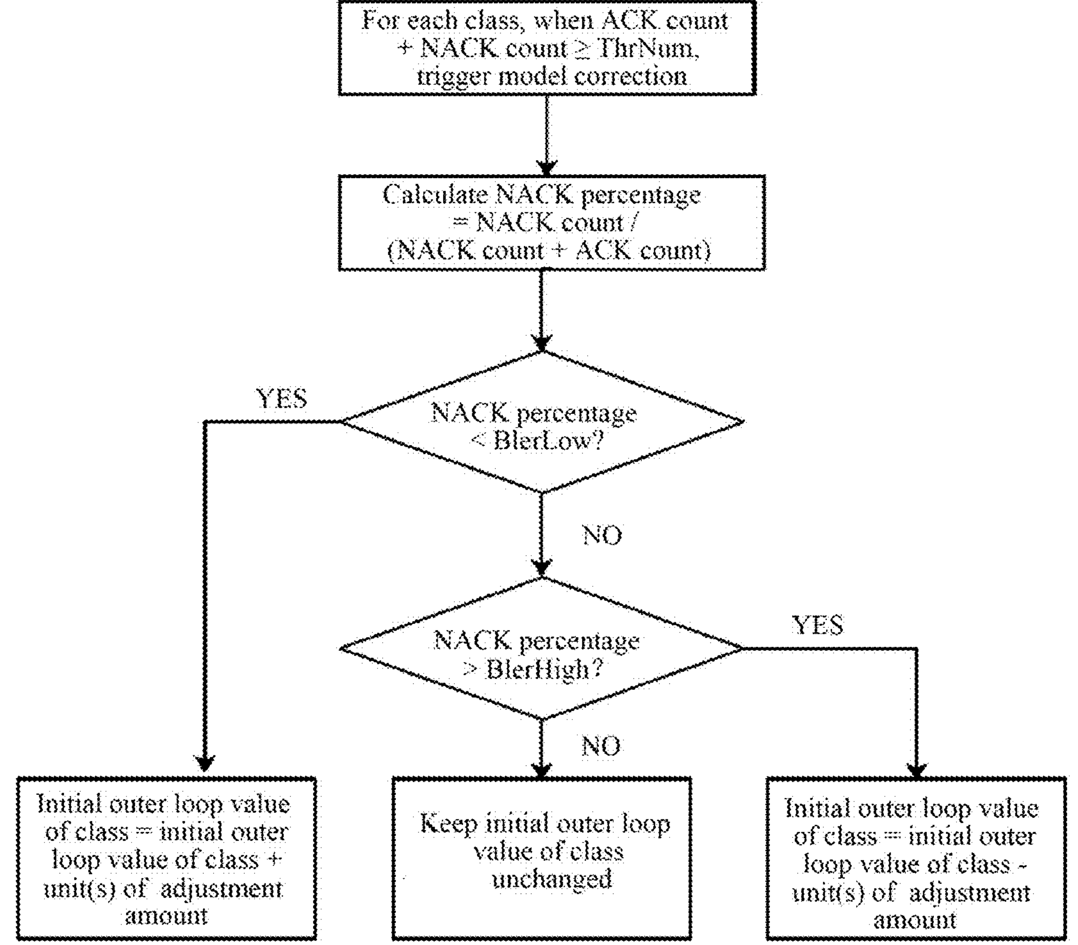
FIG. 6 is a flowchart of model modification according to an embodiment of the present disclosure.

At S310, when a sum of values of the ACK counter and the NACK counter corresponding to a class exceeds a count threshold ThrNum, model correction is performed as shown in FIG. 6, and throughout the process, only the latest model is stored. First, a ratio of the number of NACKs corresponding to the class to the sum of the number of ACKs and the number of NACKs corresponding to the class is calculated. If the ratio is lower than a first threshold BlerLow, the outer loop value of the class is increased by one unit of adjustment amount, AdjustUnit. If the ratio exceeds a second threshold BlerHigh, the outer loop value of the class is decreased by one unit of adjustment amount, AdjustUnit. Then, the values of the ACK counter and the NACK counter corresponding to this class are re-initialized to 0.

In some implementations, ThrNum=500. ThrNum with an unduly small value will lead to a loss of statistical sense of the ratio (i.e., the NACK percentage). ThrNum with an unduly great value will lead to a failure of triggering the model correction, resulting in untimely reinforcement learning. BlerLow and BlerHigh represent an upper limit and a lower limit for fluctuations around the set target value. In some cases, the target BLER (NACK percentage) may be 10%, and a fluctuation of 4% may be allowed, BlerLow and BlerHigh may be set to: BlerLow=6% and BlerHigh=14%. AdjustUnit with an unduly great value will affect the stability of reinforcement learning. AdjustUnit with an unduly small value will result in an untimely model correction. In some cases, AdjustUnit may be set to 0.7 (when the outer ring is measured in dB) or 1 (when the outer ring is measured in orders).

Example Two

First, online raster division is performed with the latest scheduling data. The online raster division includes two parts: classification of chip types of UEs and raster division based on other features. Operations S410 to S430 are directed to the classification of chip types of UEs, and operation S440 is directed to raster division based on other features.

At S410, a mapping curve of MCS versus SINR for each chip type within a target BLER range is acquired as a feature to characterize each chip type. For each chip type, the following operations S411 to S413 are performed.

At S420, a slope and an intercept of the mapping curve of each chip type are taken as a sample point to represent the chip type, a plurality of sample points each corresponding to a respective one of a plurality of chip types are clustered, and a chip type of each class is determined according to the sample point including the slope and the intercept of the respective class. A K-means clustering algorithm is adopted as the clustering method, with the number of clusters k being set to 4.

At S430, exception handling is performed. If a valid (MCS, SINR) point pair of a chip type is less than ThrDot or if the slope of the mapping curve of the MCS versus the SINR obtained by linear fitting is greater than HighThrSlope, or if the slope of the mapping curve between the MCS and the SINR obtained by linear fitting is less than LowThrSlope, it is determined that this chip type is not engaged in clustering, and all chip types that are not engaged in clustering are classified as one class, where ThrDot=4, HighThrSlope=2.5, and LowThrSlope=0.5.

S410 includes the following operations S411 to S413.

At S411, a two-dimensional table of a scheduling MCS and an inner loop SINR is constructed, where each order of the scheduling MCS corresponds to one row of the table, and every $X_1$ dB of the inner loop SINR corresponds to one column of the table, where the value of $X_1$ is 2. A scheduling feedback result ACK/NACK corresponding to the scheduling MCS and the inner loop SINR is delivered in the two-dimensional table, a sample size in each cell is calculated, and a BLER is calculated, where BLER=NACK/(ACK+NACK).

At S412, for each MCS, inner loop SINR cells whose BLERs fall within the target BLER range are selected. The target BLER range is set to [7%, 13%]. If no cell satisfies this condition, the point pair including the MCS and the corresponding inner loop SINR is recorded as (the MCS, NAN). If only one cell satisfies this condition, the point pair including the MCS and the corresponding inner loop SINR is recorded as (the MCS, a median value of two boundaries of the cell satisfies this condition). If more than one cell (e.g., Y cells) satisfies this condition, the inner loop SINR corresponding to the MCS is:

$$\sum_{i=1}^{Y} \frac{\text{sample size of an i-th cell satisfying the condition}}{\sum_{i=1}^{Y} \text{sample size of an i-th cell satisfying the condition}} \cdot \text{median value of two boundaries of the i-th cell satisfying the condition.}$$

For each MCS, one point pair (MCS, SINR) is obtained, and the point pairs in which the SINR is NAN are deleted.

At S413, a mapping curve of the MCS versus the SINR is obtained by linear fitting according to all valid (MCS, SINR) point pairs, where a slope and an intercept of the mapping curve are taken as features to characterize the chip type.

At S440, raster division is performed on the chip types, the transmission modes, the channel qualities and the interference powers of the UEs. A raster number in the chip type dimension of UEs is Nchiptype=K+1=5. For uplink transmission, there are two transmission modes (single port, closed-loop space division multiplexing), i.e., Ntrans=2. For downlink transmission, there are three transmission modes (optimal beam, closed-loop space division multiplexing, beamforming), i.e., Ntrans=3. The channel quality is divided into Nsinr=10 rasters at equal intervals. The interference power is divided into Nni=10 at equal intervals. Four-dimensional meshes with a total number of Nmesh are generated, where Nmesh=Nchiptype×Ntrans×Nri×Nsinr×Nni=2000 (for uplink) or 6000 (for downlink). Each raster is identified by a raster identifier (ID).

At S450, an outer loop corresponding to each of the rasters is determined.

S450 includes the following operations S451 and S452.

At S451, a one-dimensional table of outer-loop is constructed, where every $X_2$ dB of the outer loop corresponds to one cell, and $X_2=2$. A corresponding scheduling feedback result ACK/NACK is delivered in the one-dimensional table according to the feature and outer loop corresponding to the raster, a sample size in each cell is calculated, and a BLER is calculated, where BLER=NACK/(ACK+NACK).

At S452, outer loop cells whose BLERs fall within the target BLER range are selected, where the target BLER range is set to [7%, 13%]. If no cell satisfies this condition, the sample size corresponding to the raster is recorded as 0, and the outer loop corresponding to the raster is a default value, where the default value is a unified initial outer loop value configured for all UEs by a conventional AMC policy. If only one cell satisfies this condition, the sample size corresponding to the raster is recorded as a sample size of the cell, and the outer loop corresponding to the raster is the median value of the two boundaries of the cell that satisfies this condition). If more than one cell (e.g., Y cells) satisfies this condition, the sample size corresponding to the raster is a sum of sample sizes of the Y cells that satisfy this condition, and the outer loop corresponding to the raster is:

$$\sum_{i=1}^{Y} \frac{\text{sample size of an i-th cell satisfying the condition}}{\sum_{i=1}^{Y} \text{sample size of an i-th cell satisfying the condition}} \cdot \text{median value of two boundaries of the i-th cell satisfying the condition.}$$

At 460, each raster has a corresponding sample size and a corresponding outer loop. The raster is characterized by the corresponding outer loop in the raster, and the specific raster division is determined by means of the concept of decision regression tree. The following operations S461 to S464 are included.

At S461, all features and splittable points of the features are traversed, and an optimal splitting feature j satisfying $$\min_{j,s}\left(\sum_{x_i \in R_1(j,s)} (y_i - c_1)^2 + \sum_{x_i \in R_2(j,s)} (y_i - c_2)^2\right)$$

and an optimal splitting point of this feature is selected. In the formula, $x_i$ represents a raster i, and $y_i$ represents a corresponding outer loop in the raster i; $R_1(j,s)=\{x|x^j \le s\}$ and $R_2(j,s)=\{x|x^j > s\}$ represents two classes obtained by classification, $x^j \le s$ represents all rasters with the feature j≤s, and $x^j > s$ represents all rasters with the feature j>s;

$$c_1 = \sum_{x_i \in R_1(j,s)} \frac{num_i}{\sum_{x_i \in R_1(j,s)} num_i} \cdot y_i$$

represents a weighted average of outer loops corresponding to all rasters belonging to the first class, and $$c_2 = \sum_{x_i \in R_2(j,s)} \frac{num_i}{\sum_{x_i \in R_2(j,s)} num_i} \cdot y_i$$

represents a weighted average of outer loops corresponding to all rasters belonging to the second class; and $num_i$ represents a sample size corresponding to the raster i.

At S462, classification is performed by means of the selected splitting feature j and the splitting point s, and $c_1$ and $c_2$ are respectively determined as the outer loop value of the classes.

At S463, S461 and S462 continue to be called for the two classes until a stop condition is satisfied. The stop condition is that a mean square error $$\sum_{x_i \in R(j,s)} (y_i - c)^2$$

of any class is less than a threshold ThrMse or a number of classes exceeds a threshold ThrNcluster, where ThrMse=0.5 and ThrNcluster=100.

At S464, a regression tree is generated, where each leaf node represents one class, a total number of classes is defined as Ncluster, and each class is numbered and identified by a class ID which is stored.

The basic model determination includes the following operation S470.

At S470, a mapping relationship between raster IDs and class IDs is established according to a regression tree result, where an outer loop value of each class is $$c = \sum_{x_i \in R(j,s)} \frac{num_i}{\sum_{x_i \in R(j,s)} num_i} \cdot y_i.$$

The model application includes the following operations S480 and S490.

At S480, when the initial outer loop value corresponding to the transmission mode of the UE is to be determined, the raster to which the UE belongs is determined according to the chip type, transmission mode, channel quality, and interference power of the UE, a class ID is found according to the mapping relationship between the raster IDs and the class IDs, and the outer loop value of the class is determined as an initial outer loop value of the transmission mode of the UE.

At S490, the class ID found in the above process is marked for the UE in this scheduling.

Model correction based on the idea of reinforcement learning is performed according to the scheduling feedback result of each class, that is, the outer loop value stored for each class is adjusted, so as to better adapt to the current actual environment. If the ratio of the number of NACKs corresponding to the class to the sum of the number of ACKs and the number of NACKs corresponding to the class is lower than a first set value, the outer loop value of the class is increased. If the ratio of the number of NACKs corresponding to the class to the sum of the number of ACKs and the number of NACKs corresponding to the class exceeds a second set value, the outer loop value in the class is decreased. Otherwise, the outer loop value of the class is kept unchanged.

The model correction includes the following operations S500 and S510.

At S500, after receiving a scheduling feedback result marked with the class ID, a number of ACKs and a number of NACKs are counted for the corresponding class according to the scheduling feedback result. If the scheduling feedback result is ACK, 1 is added to an ACK counter corresponding to the class. If the scheduling feedback result is NACK, 1 is added to an NACK counter corresponding to the class.

At S510, when a sum of the ACK counter and the NACK counter corresponding to a class exceeds a count threshold ThrNum, model correction is performed as shown in FIG. 6, and throughout the process, only the latest model is stored. First, a ratio of the number of NACKs corresponding to the class to the sum of the number of ACKs and the number of NACKs corresponding to the class is calculated. If the ratio is lower than a first threshold BlerLow, the outer loop value of the class is increased by one unit of adjustment amount AdjustUnit. If the ratio exceeds a second threshold BlerHigh, the outer loop value of the class is decreased by a unit adjustment amount AdjustUnit. Then, the ACK counter and the NACK counter corresponding to this class are re-initialized to 0.

In some implementations, ThrNum=500. ThrNum with an unduly small value will lead to a loss of statistical sense of the ratio (i.e., the NACK percentage). ThrNum with an unduly great value will lead to a failure of triggering the model correction, resulting in an untimely reinforcement learning. BlerLow and BlerHigh represent an upper limit and a lower limit for fluctuations around the set target value. In some cases, the target BLER (NACK percentage) may be 10%, and a fluctuation of 4% may be allowed, BlerLow and BlerHigh may be set to: BlerLow=6% and BlerHigh=14%. AdjustUnit with an unduly great value will affect the stability of reinforcement learning. AdjustUnit with an unduly small value will result in an untimely model correction. In some cases, AdjustUnit may be set to 0.7 (when the outer ring is measured in dB) or 1 (when the outer ring is measured in orders).

The model effect evaluation includes following operations S520 to S540.

At S520, during model correction, if the sum of the ACK counter and the NACK counter corresponding to a class exceeds the count threshold ThrNum, it is necessary to calculate the ratio of the number of NACKs corresponding to the class to the sum of the number of ACKs and the number of NACKs corresponding to the class, and then periodically determine the convergence of the model. Regardless of the class ID, latest ThrWindow NACK ratios calculated are obtained using a sliding window, where ThrWindow=50.

At S530, in a convergence determination period, the ThrWindow NACK ratios in a statistics window are sequentially compared with BlerLow and BlerHigh, the number of ratios CounterWin where the NACK ratios are not lower than BlerLow and not greater than BlerHigh is recorded. If CounterWin/ThrWindow>ThrRatio, it is determined that the model has converged, and the process proceeds to S540; otherwise, wait for a subsequent convergence determination period, where ThrRatio=60%, and the convergence determination period is set to 3 hours.

At S540, within a limited statistical duration, only scheduling results (ACK/NACK) of the first NumThr times of new transmission scheduling of each UE are counted, and the scheduling results of all the UEs are mixed to calculate a BLER (NACK percentage), where NumThr=50, and the statistical duration is set to 30 minutes. It is determined according to the obtained BLER whether the model effect is normal. If the model effect is considered to be normal, model application, model correction, and model effect evaluation continue to be performed. If the model effect is considered to be abnormal, the first operation, i.e., online raster division, is triggered, a basic model is determined based on a new division result, and then model application, model correction, and model effect evaluation are performed. The statistical determination includes the following operations S541 to S543.

At S541, a total number of times of scheduling SchdNumSum counted at the cell level is initialized to 0, and a number of NACK counts NackNumSum counted at the cell level is initialized to 0.

At S542, after UE instances are established for all new UEs accessing the cell within the specified statistical duration, a UE-level counter NumCounter is initialized to 0. After each scheduling of the UE, if the scheduling is a new transmission scheduling, it is determined whether NumCounter exceeds NumThr. If yes, let SchdNumSum=SchdNumSum+1, and it is further determined whether a scheduling result of this scheduling is NACK. If the scheduling result of this scheduling is NACK, let NackNumSum=NackNumSum+1.

At S543, when the limited statistical duration expires, a cell-level BLER=NackNumSum/SchdNumSum is calculated, and if the cell-level BLER is lower than the threshold BlerLow, it is considered that the model effect is abnormal. If the cell-level BLER exceeds the threshold BlerHigh, it is considered that the model effect is abnormal; otherwise, it is considered that the model effect is normal.

In addition, an embodiment of the present disclosure further provides an apparatus. The apparatus includes: a memory, a processor, and a computer program stored in the memory and executable by the processor. The processor and the memory may be connected by a bus or in other ways.

The memory, as a non-transitory computer-readable storage medium, may be configured for storing a non-transitory software program and a non-transitory computer-executable program. In addition, the memory may include a high-speed random-access memory, and may also include a non-transitory memory, e.g., at least one magnetic disk storage device, flash memory device, or other non-transitory solid-state storage device. In some implementations, the memory may include memories located remotely from the processor, and the remote memories may be connected to the processor via a network. Examples of the network include, but are not limited to, the Internet, an intranet, a local area network, a mobile communication network, and combinations thereof.

A non-transitory software program and an instruction required to implement the method for adjusting an initial outer loop value in the above embodiments are stored in the memory which, when executed by the processor, causes the processor to implement the method for adjusting an initial outer loop value in the above embodiments, for example, operations S110 to S140 of the method described in conjunction with FIG. 1, operations S121 to S123 of the method described in conjunction with FIG. 2, operations S210 to S310 of the method as described in the above embodiments, or operations S410 to S543 of the method as described in the above embodiments.

The apparatus embodiments described above are merely illustrative. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present disclosure also provides a computer-readable storage medium, storing a computer-executable instruction which, when executed by a processor or controller, for example, by a processor in the terminal device embodiment described above, causes the processor to implement the method for adjusting an initial outer loop value in the above embodiments, for example, operations S110 to S140 of the method described in conjunction with FIG. 1, operations S121 to S123 of the method described in conjunction with FIG. 2, operations S210 to S310 of the method described in the above embodiments, and operations S410 to S543 of the method described in the above embodiments.

According to the method for adjusting an initial outer loop value in the embodiments of the present disclosure, feature information of a plurality of UEs scheduled by a cell is acquired; raster division is performed on the feature information of the plurality of UEs to obtain a plurality of rasters; an outer loop corresponding to each of the rasters is determined, where an outer loop value of the raster is within a target BLER range; and when an initial outer loop value of a target UE is to be determined, the target raster to which the UE belongs is selected according to the feature information of the target UE, and then the corresponding outer loop value is determined as an initial outer loop value of the target UE according to the target raster. That is, a UE can determine its respective initial outer loop values according to the raster to which the UE belongs. Compared with conventional schemes in which all UEs share a unified initial outer loop value, the method of the present disclosure can better adapt to the current actual wireless environment and is more robust to environmental changes. The initial outer loop value obtained is closer to a converged value for the converged state, which is beneficial to expedite the convergence of the outer loop and improve the spectral efficiency.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information passing medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A method for adjusting an initial outer loop value, comprising:

acquiring feature information of a plurality of User Equipment (UEs) scheduled by a cell, wherein the feature information comprises chip types of the UEs;

performing raster division on the feature information of the plurality of UEs to obtain a plurality of rasters, which comprises:

determining a mapping curve of a Modulation and Coding Scheme (MCS) versus a Signal-to-Interference-plus-Noise Ratio (SINR) for each of the chip types within a target Block Error Rate (BLER);

characterizing each of the chip types with a respective mapping curve, and clustering all the chip types to obtain a chip type classification result; and performing raster division on the chip types according to the chip type classification result;

determining an outer loop corresponding to each of the rasters, and wherein an outer loop value of each raster is within the target BLER range;

determining a target raster corresponding to a target UE according to the feature information of the target UE, wherein the target UE is one of the plurality of UEs scheduled by the cell; and determining the outer loop value corresponding to the target raster as an initial outer loop value of the target UE.

2. The method of claim 1, wherein determining a mapping curve of an MCS versus an SINR for each of the chip types within the target BLER range comprises:

constructing a two-dimensional table of the MCS and the SINR, and correspondingly delivering a scheduling feedback result in the two-dimensional table according to the MCS and the SINR, wherein the scheduling feedback result comprises an Acknowledgement (ACK) or a Negative Acknowledgement (NACK);

calculating a BLER of each cell in the two-dimensional table according to the ACK and NACK in the scheduling feedback result; and selecting a plurality of first cells whose BLERs satisfy the target BLER range, wherein each of the first cells contains a pair of MCS and SINR information, and obtaining the mapping curve of the MCS versus the SINR according to all the first cells.

3. The method of claim 1, wherein the feature information further comprises transmission modes, channel qualities and interference powers, and performing raster division on the feature information of the plurality of UEs further comprises:

respectively performing raster division on the transmission modes, the channel qualities and the interference powers, and obtaining a plurality of rasters corresponding to the transmission modes, a plurality of rasters corresponding to the channel qualities and a plurality of rasters corresponding to the interference powers; and generating a multi-dimensional mesh according to the plurality of rasters respectively corresponding to the chip types, the transmission modes, the channel qualities, and the interference powers, wherein, each of the plurality of rasters is one dimensional.

4. The method of claim 1, wherein determining an outer loop corresponding to each of the rasters comprises:

constructing a one-dimensional table of the outer-loop, and correspondingly delivering ACK or NACK in a scheduling feedback result in the one-dimensional table of the outer-loop, according to the raster and the outer loop;

calculating a BLER of each cell in the one-dimensional table of the outer-loop, according to the ACK and NACK in the scheduling feedback result; and selecting a plurality of second cells whose BLERs satisfy the target BLER range, wherein each of the second cells contains two pieces of information respectively representing an outer loop and a sample size; and obtaining an outer loop value and a sample size of each of the rasters through weighted averaging on all the second cells.

5. The method of claim 4, further comprising:

clustering all the rasters according to a decision regression tree method to obtain a plurality of classes;

numbering each of the rasters to obtain a plurality of raster identification numbers;

numbering each of the obtained classes to obtain a plurality of class identification numbers; and establishing a mapping relationship between the raster identification numbers and the class identification numbers, wherein an outer loop value of the class is obtained from the outer loop values and the sample sizes of all the rasters corresponding to the class.

6. The method of claim 5, wherein obtaining an outer loop value of the class from the outer loop values and the sample sizes of all the rasters corresponding to the class comprises:

determining all the rasters under each class according to the mapping relationship between the raster identification numbers and the class identification numbers, and calculating the outer loop value of the class by weighted averaging on the outer loop values and the sample sizes of all the rasters.

7. The method of claim 6, wherein determining the outer loop value corresponding to the target raster as an initial outer loop value of the target UE comprises:

finding the class corresponding to the target raster according to the mapping relationship between the raster identification numbers and the class identification numbers, and determining the outer loop value of the class as the initial outer loop value of the target UE.

8. The method of claim 7, wherein after determining the outer loop value of the class as the initial outer loop value of the target UE, the method comprises:

adjusting the outer loop value of each class according to the scheduling feedback result.

9. The method of claim 8, wherein adjusting the outer loop value of each class according to the scheduling feedback result comprises:

counting a number of ACKs and a number of NACKs for the corresponding class according to the scheduling feedback result;

increasing the outer loop value of the class in response to a ratio of the number of NACKs corresponding to the class to a sum of the number of ACKs and the number of NACKs corresponding to the class being less than a first set value; and decreasing the outer loop value of the class in response to the ratio of the number of NACKs corresponding to the class to the sum of the number of ACKs and the number of NACKs corresponding to the class being greater than a second set value.

10. The method of claim 9, wherein adjusting the outer loop value of each class according to the scheduling feedback result further comprises:

keeping the outer loop value of the class unchanged in response to the ratio of the number of NACKs corresponding to the class to the sum of the number of ACKs and the number of NACKs corresponding to the class being greater than or equal to the first set value and less than or equal to the second set value.

11. The method of claim 1, further comprising:

calculating a BLER according to the scheduling feedback results of all the target UEs; and determining whether the BLER satisfies a preset value, and in response to a failure of the BLER in satisfying the preset value, re-executing raster division on the feature information of the plurality of UEs, and re-determining the initial outer loop value of the target UE.

12. An apparatus, comprising: a memory, a processor, and a computer program stored in the memory and executable by the processor which, when executed by the processor, causes the processor to perform a method for adjusting an initial outer loop value, comprising:

acquiring feature information of a plurality of User Equipment (UEs) scheduled by a cell, wherein the feature information comprises chip types of the UEs;

performing raster division on the feature information of the plurality of UEs to obtain a plurality of rasters, which comprises:

determining a mapping curve of a Modulation and Coding Scheme (MCS) versus a Signal-to-Interference-plus-Noise Ratio (SINR) for each of the chip types within a target Block Error Rate (BLER);

characterizing each of the chip types with a respective mapping curve, and clustering all the chip types to obtain a chip type classification result; and performing raster division on the chip types according to the chip type classification result;

determining an outer loop corresponding to each of the rasters, wherein an outer loop value of each raster is within the target BLER range;

determining a target raster corresponding to a target UE according to the feature information of the target UE, wherein the target UE is one of the plurality of UEs scheduled by the cell; and determining the outer loop value corresponding to the target raster as an initial outer loop value of the target UE.

13. The apparatus of claim 12, wherein determining a mapping curve of an MCS versus an SINR for each of the chip types within the target BLER range comprises:

constructing a two-dimensional table of the MCS and the SINR, and correspondingly delivering a scheduling feedback result in the two-dimensional table according to the MCS and the SINR, wherein the scheduling feedback result comprises an Acknowledgement (ACK) or a Negative Acknowledgement (NACK);

calculating a BLER of each cell in the two-dimensional table according to the ACK and NACK in the scheduling feedback result; and selecting a plurality of first cells whose BLERs satisfy the target BLER range, wherein each of the first cells contains a pair of MCS and SINR information, and obtaining the mapping curve of the MCS versus the SINR according to all the first cells.

14. The apparatus of claim 12, wherein the feature information further comprises transmission modes, channel qualities and interference powers, and performing raster division on the feature information of the plurality of UEs further comprises:

respectively performing raster division on the transmission modes, the channel qualities and the interference powers, and obtaining a plurality of rasters corresponding to the transmission modes, a plurality of rasters corresponding to the channel qualities and a plurality of rasters corresponding to the interference powers; and generating a multi-dimensional mesh according to the plurality of rasters respectively corresponding to the chip types, the transmission modes, the channel qualities, and the interference powers, wherein, each of the plurality of rasters is one dimensional.

15. The apparatus of claim 12, wherein determining an outer loop corresponding to each of the rasters comprises:

constructing a one-dimensional table of the outer-loop, and correspondingly delivering ACK or NACK in a scheduling feedback result in the one-dimensional table of the outer-loop, according to the raster and the outer loop;

calculating a BLER of each cell in the one-dimensional table of the outer-loop, according to the ACK and NACK in the scheduling feedback result; and selecting a plurality of second cells whose BLERs satisfy the target BLER range, wherein each of the second cells contains two pieces of information respectively representing an outer loop and a sample size; and obtaining an outer loop value and a sample size of each of the rasters through weighted averaging on all the second cells.

16. The apparatus of claim 15, further comprising:

clustering all the rasters according to a decision regression tree method to obtain a plurality of classes;

numbering each of the rasters to obtain a plurality of raster identification numbers;

numbering each of the obtained classes to obtain a plurality of class identification numbers; and establishing a mapping relationship between the raster identification numbers and the class identification numbers, wherein an outer loop value of the class is obtained from the outer loop values and the sample sizes of all the rasters corresponding to the class.

17. The apparatus of claim 16, wherein obtaining an outer loop value of the class from the outer loop values and the sample sizes of all the rasters corresponding to the class comprises:

determining all the rasters under each class according to the mapping relationship between the raster identification numbers and the class identification numbers, and calculating the outer loop value of the class by weighted averaging on the outer loop values and the sample sizes of all the rasters.

18. A non-transitory computer-readable storage medium, storing a computer-executable instruction which, when executed by a processor, causes the processor to perform a method for adjusting an initial outer loop value, comprising:

acquiring feature information of a plurality of User Equipment (UEs) scheduled by a cell, wherein the feature information comprises chip types of the UEs;

performing raster division on the feature information of the plurality of UEs to obtain a plurality of rasters, which comprises:

determining a mapping curve of a Modulation and Coding Scheme (MCS) versus a Signal-to-Interference-plus-Noise Ratio (SINR) for each of the chip types within a target Block Error Rate (BLER);

characterizing each of the chip types with a respective mapping curve, and clustering all the chip types to obtain a chip type classification result; and performing raster division on the chip types according to the chip type classification result;

determining an outer loop corresponding to each of the rasters, wherein an outer loop value of each raster is within the target BLER range;

determining a target raster corresponding to a target UE according to the feature information of the target UE, wherein the target UE is one of the plurality of UEs scheduled by the cell; and determining the outer loop value corresponding to the target raster as an initial outer loop value of the target UE.

* * * * *